US010130964B2

(12) United States Patent
Sun

(10) Patent No.: US 10,130,964 B2
(45) Date of Patent: Nov. 20, 2018

(54) ADJUSTABLE PUMP

(71) Applicant: SHANP-YIH PRECISION INDUSTRIAL CO., LTD., Taichung (TW)

(72) Inventor: Chih-Chung Sun, Taichung (TW)

(73) Assignee: SHANP-YIH PRECISION INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/289,875

(22) Filed: Oct. 10, 2016

(65) Prior Publication Data

US 2018/0099299 A1 Apr. 12, 2018

(51) Int. Cl.

| | |
|---|---|
| *B65D 88/54* | (2006.01) |
| *G01F 11/00* | (2006.01) |
| *B05B 11/00* | (2006.01) |
| *A47K 5/12* | (2006.01) |

(52) U.S. Cl.

CPC ........ *B05B 11/3008* (2013.01); *A47K 5/1205* (2013.01)

(58) Field of Classification Search

CPC .......................... B05B 11/3008; A47K 5/1205

USPC ............................................ 222/309, 153.13

See application file for complete search history.

(56) References Cited

U.S. PATENT DOCUMENTS

| | | | | | |
|---|---|---|---|---|---|
| 4,433,799 | A * | 2/1984 | Corsette | B05B 11/3008 222/309 |
| 9,757,751 | B2 * | 9/2017 | Chen | B05B 11/0091 |
| 2009/0071985 | A1 * | 3/2009 | Ki | B05B 11/0027 222/309 |
| 2009/0120963 | A1 * | 5/2009 | Bae | B05B 11/0032 222/153.13 |
| 2011/0031282 | A1 * | 2/2011 | Hagen | B05B 11/3001 222/321.7 |
| 2012/0292344 | A1 * | 11/2012 | Bertin | B05B 11/0032 222/153.13 |
| 2013/0200107 | A1 * | 8/2013 | Presche | B05B 11/0032 222/153.13 |
| 2014/0209636 | A1 * | 7/2014 | Wang | B05B 11/3002 222/153.13 |
| 2014/0263460 | A1 * | 9/2014 | Chen | B05B 11/0032 222/183 |
| 2015/0108171 | A1 * | 4/2015 | Kim | B05B 11/3001 222/321.3 |

* cited by examiner

*Primary Examiner* — Jeremy W Carroll

(57) ABSTRACT

An adjustable pump includes a ring connected to an open end of a container, a cap rectilinearly movable relative to the ring to dispense fluid from the container, and a quantity-adjusting unit that includes a limiting element and a knob. The limiting element is adapted for contacting the cap and hence limiting the rectilinear movement of the cap relative to the ring. The limiting element is rectilinearly movable relative to the ring to adjust a stroke of the movement of the cap relative to the ring. The limiting element includes at least one boss. The knob is rotatable relative to the ring around the limiting element. The knob includes at least one helical groove that receives the boss so that the limiting element is moved relative to the ring as the knob is rotated relative to the ring.

9 Claims, 6 Drawing Sheets

ADJUSTABLE PUMP

BACKGROUND OF INVENTION

1. Field of Invention

The present invention relates to a pump for use with a container and, more particularly, to an adjustable pump for providing an adjustable amount of fluid from a container with one stroke.

2. Related Prior Art

Emulsion such as body wash, lotion, shampoo and conditioner can be stored in a container such as a bottle and a jaw that is equipped with a pump. A user presses the pump to dispense the emulsion from the container. However, it is difficult to control the amount of emulsion dispensed from the container with one stroke of the pump. If the amount is too small, the user will have to press the pump a second time. If the amount is too large, it will be a waste.

Therefore, the present invention is therefore intended to obviate or at least alleviate the problems encountered in prior art.

SUMMARY OF INVENTION

It is the primary objective of the present invention to provide a container with an adjustable pump.

To achieve the foregoing objective, the adjustable pump includes a ring connected to an open end of a container, a cap rectilinearly movable relative to the ring to dispense fluid from the container, and a quantity-adjusting unit that includes a limiting element and a knob. The limiting element is adapted for contacting the cap and hence limiting the rectilinear movement of the cap relative to the ring. The limiting element is rectilinearly movable relative to the ring to adjust a stroke of the movement of the cap relative to the ring. The limiting element includes at least one boss. The knob is rotatable relative to the ring around the limiting element. The knob includes at least one helical groove that receives the boss so that the limiting element is moved relative to the ring as the knob is rotated relative to the ring.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
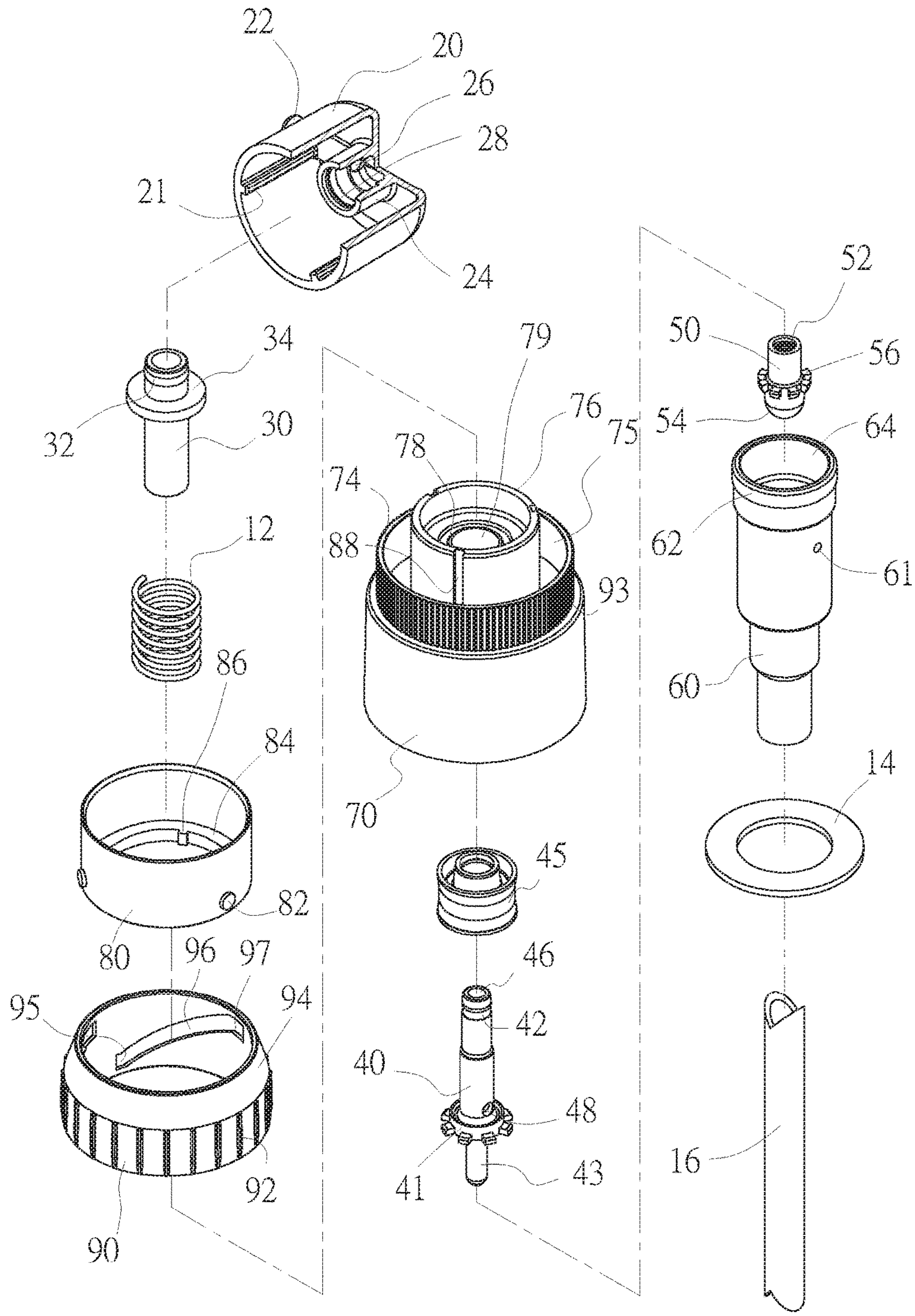
FIG. 1 is an exploded view of an adjustable pump according to the preferred embodiment of the present invention.
Figure 2:
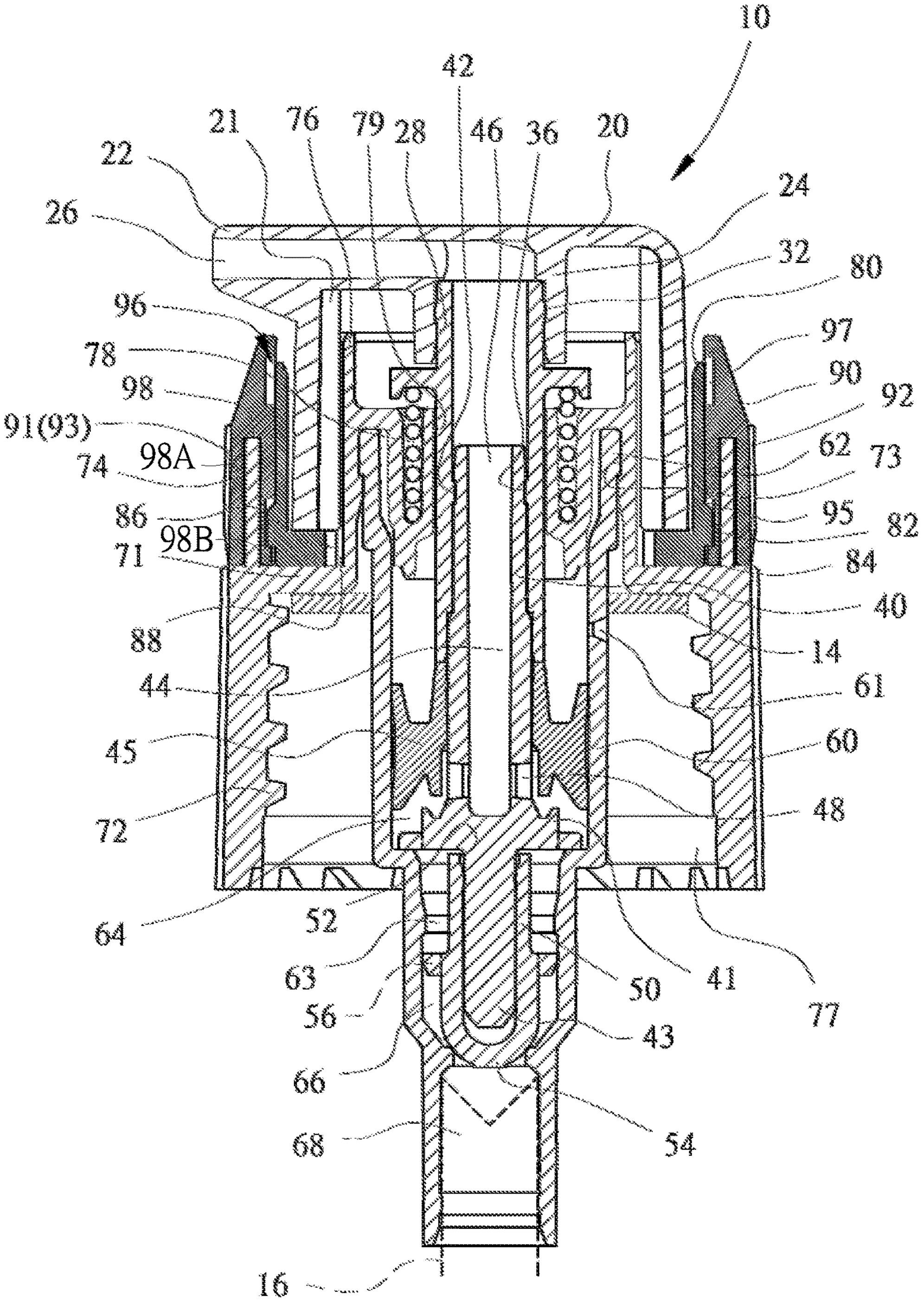
FIG. 2 is an enlarged cross-sectional view of the adjustable pump shown in FIG. 1.
Figure 3:
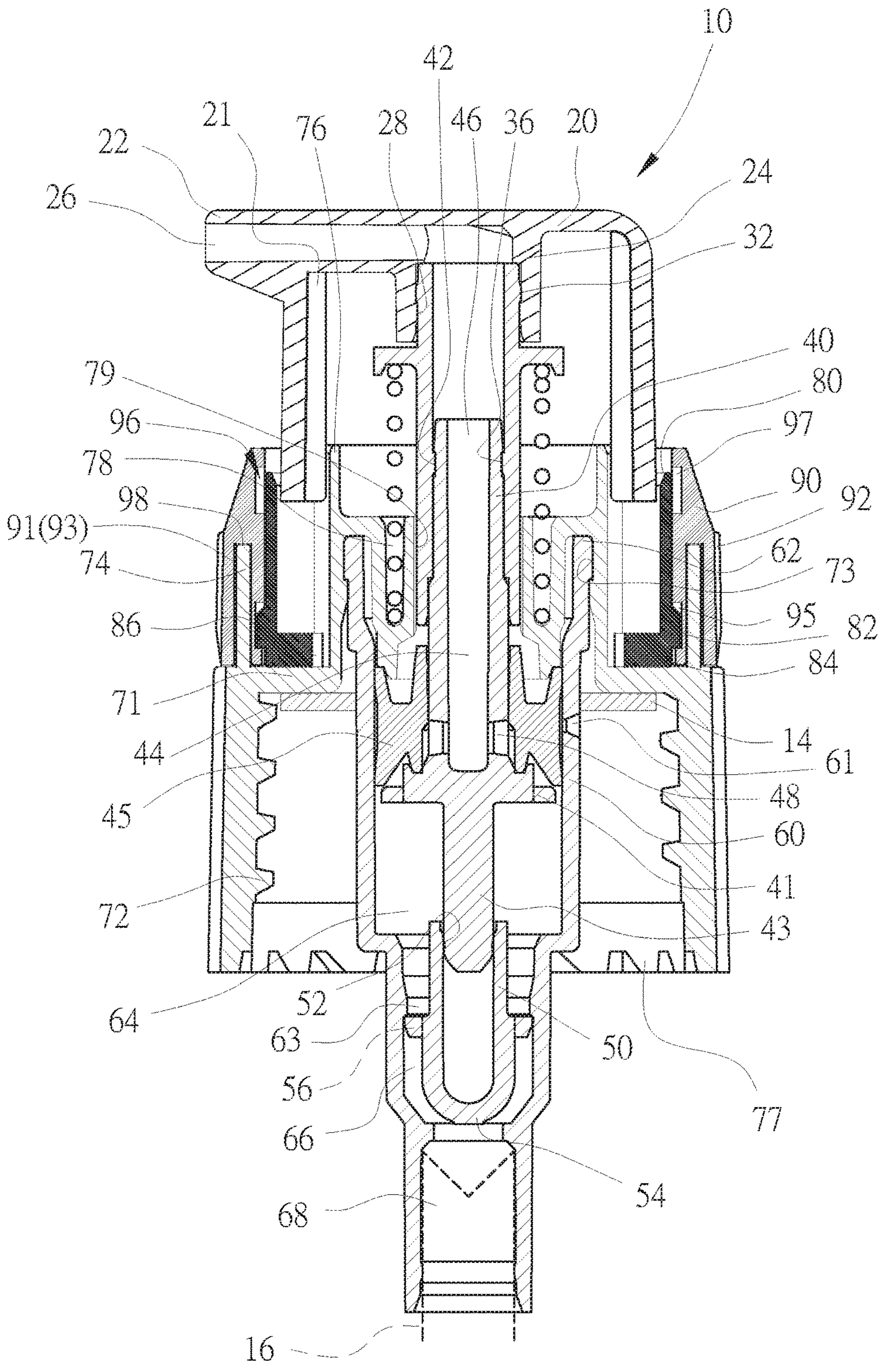
FIG. 3 is a cross-sectional view of the adjustable pump in another position than shown in FIG. 2.
Figure 4:
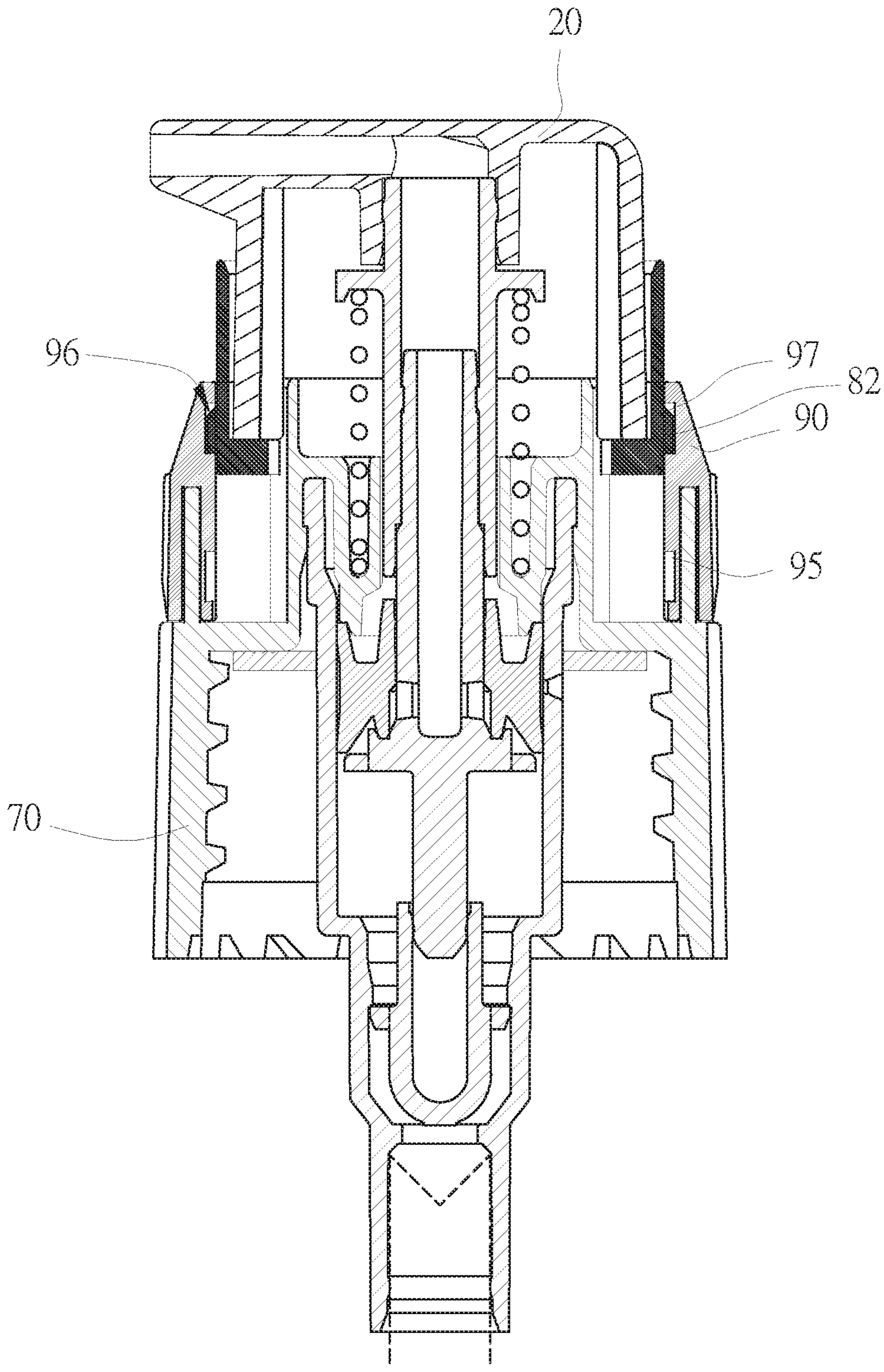
FIG. 4 is a cross-sectional view of the adjustable pump in another position than shown in FIG. 3.

Referring to FIGS. 1 to 3, a pump 10 includes a spring 12, a washer 14, a tube 16, a cap 20, a ring 70, a core and a quantity-adjusting unit according to the preferred embodiment of the present invention. The core connects the cap 20 to the ring 70 to render the cap 20 movable relative to the ring 70 between an original position and a fully pressed position. The quantity-adjusting unit is operable to decide how far the cap 20 can be pressed and hence how much fluid can be dispensed by the pump 10 with a stroke.

The cap 20 includes a connective portion 24 co-axially formed in a shell (not numbered). Three blades 21 longitudinally extend on an internal face of the shell. A nozzle 22 extends from the shell in a radial manner. A channel 26 is made in the nozzle 22. The channel 26 is in communication with the exterior of the cap 20 at an end and connected to the connective portion 24 at another end. The connective portion 24 is in the form of a circular drum with a closed end and an open end. An annular rib 28 extends on an internal face of the connective portion 24.

The ring 70 includes a first section (not numbered) and a second section 76. The diameter of the first section of the ring 70 is larger than that of the second section 76 so that a shoulder 71 is formed between the first section of the ring 70 and the second section 76. The first section of the ring 70 includes a space 77. A thread 72 extends on an internal face of the first section of the ring 70. The second section 76 includes two co-axial annular grooves 73 and 78 and an axial tunnel 79. The diameter of the annular groove 73 is larger than that of the annular groove 78. The annular groove 73 includes an open lower end. The annular groove 78 is in communication with the space 77. An annular wall 74 extends from the shoulder 71. The annular wall 74 extends coaxially around the second section 76, separated from each other by a space 75.

The core includes a pipe 30, a plunger 40, a piston 45, a check valve 50 and a body 60. The pipe 30 includes an annular rib 32 on an external face, an annular apron 34 on the external face, and another annular rib 36 on an internal face.

The plunger 40 includes a collar 41 on an external face, an annular groove 42 in the external face, a shank 43 of a reduced diameter at an end, and a passageway 44 axially therein. The collar 41 includes a serrated profile that includes alternatively arranged radial bosses and recesses (not numbered). The passageway 44 includes an exit 46 at an upper end and two entrances 48 near the collar 41. The passageway 44 includes two sections.

The check valve 50 is a hollow element that includes an open end 52 and a closed end 54. The check valve 50 further includes stops 56 evenly formed on an external face. The check valve 50 preferably includes an annular rib (not numbered) on an internal face, near the open end 52.

The body 60 is in the form of a stepped circular drum. The body 60 sequentially includes a pressure chamber 64, a flow chamber 66 and a bore 68. The diameter of the pressure chamber 64 is larger than that of the flow chamber 66. The diameter of the flow chamber 66 is larger than that of the bore 68. The pressure chamber 64 is in communication with the flow chamber 66. The flow chamber 66 is in communication with the bore 68. A flange 62 extends on an external face of the pressure chamber 64, i.e., near an end of the body 60. An annular rib 63 extends on an internal face of the body 60, in the flow chamber 66.

The plunger 40 extends throughout the piston 45. The shank 43 is inserted in the check valve 50 via the open end 52. The surface of the shank 43 is in contact with an internal face of the check valve 50 so that the shank 43 cannot be easily removed from the check valve 50 but can be moved in the check valve 50.

The body 60 is inserted in the ring 70. The flange 62 is inserted in the annular groove 73 to keep the body 60 in the ring 70. The shank 43 and the check valve 50 are inserted in the flow chamber 66 via the pressure chamber 64 after the stops 56 are forced past the annular rib 63. The plunger 40 and the piston 45 are inserted in the pressure chamber 64.

The pipe 30 is inserted in the connective portion 24 of the cap 20 so that the interior of the pipe 30 is in communication with that of the connective portion 24. The annular rib 32 is engaged with the annular rib 28 to keep the pipe 30 in the cap 20. The pipe 30 extends throughout the axial tunnel 79 before the plunger 40 is inserted in the pipe 30. The annular rib 36 is inserted in the annular groove 42 to keep the plunger 40 in the pipe 30. Thus, the exit 46 of the passageway 44 is in communication with the channel 26 of the nozzle 22 via the pipe 30 and the connective portion 24 of the cap 20.

A spring 12 is compressed between the annular apron 34 and the second section 76 of the ring 70. Thus, the spring 12 tends to keep the cap 20 in the original position (FIG. 3) relative to the ring 70. The spring 12 is inserted in the annular groove 78. The piston 45 is movable to and fro on the plunger 40. The piston 45 can be moved in a direction by the collar 41 to abut against an internal face of the ring 70 to close the aperture 61.

When the ring 70 is tightened on an open end of a container such as a bottle and a jar, the washer 14 is inserted in the second space 77 of the ring 70, placed around the body 60 and abutted against the shoulder 71 to prevent leak from the bottle. An end of the tube 16 is placed against the wall of the bore 68, and another end of the tube 16 extends deep into the container.

As the cap 20 is moved to the fully pressed position shown in FIG. 2, the pipe 30 moves the piston 45 relative to the body 60 in a same sense of direction to open the aperture 61. The plunger 40 moves with the pipe 30 to place the collar 41 at a point of communication of the pressure chamber 64 with the flow chamber 66. The serrated profile of the collar 41 keeps the entrances 48 open. At the same time, the shank 43 moves the check valve 50 due to the friction between them. The closed end 54 separates the flow chamber 66 from the bore 68 to avoid travel of the fluid in a reversed sense of direction. The shank 43 remains deep in the check valve 50, the fluid travels into the pressure chamber 64 from the flow chamber 66, enters the passageway 44 of the plunger 40 via the entrances 48, reaches the interior of the pipe 30 through the exit 46, and leaves the nozzle 22 via the channel 26.

There is a gap between the pipe 30 and the ring 70 to allow air to enter a place above the piston 45 from the exterior of the container, and enters the container via the aperture 61. There is no vacuum in the container to affect the operation of the pump 10.

The cap 20 is released to allow the spring 12 to exert a force on the annular apron 34 to move the pipe 30 relative to the body 60, thereby moving the cap 20 toward the original position shown in FIG. 3. The shank 43 moves together with the plunger 40 away from the check valve 50. When a lower section of the shank 43 is engaged with (or pinched by) the annular rib that extends on the internal face of the check valve 50, the shank 43 moves the check valve 50 in a same sense of direction so that the closed end 54 does not separate the flow chamber 66 from the bore 68. Thus, the core provides suction to the bore 68 so that fluid is sucked into the flow chamber 66 via the tube 16.

When the stops 56 are engaged with the annular rib 63, fluid travels into the pressure chamber 64 from the flow chamber 66 via the gaps between the stops 56. Thus, the fluid continues to enter the flow chamber 66. When the plunger 40 moves the collar 41 upwards into contact with the piston 45, the piston 45 blocks the entrances 48 to keep fluid out of the passageway 44. Moreover, the piston 45 blocks the aperture 61 to keep fluid out of the container. Now, the cap 20 is ready for another downward stroke.

The quantity-adjusting unit includes a limiting element 80 and a knob 90. The limiting element 80 is inserted in the pump 10. The limiting element 80 is movable along an axis of the pump 10 to adjust the distance of movement (or "the length of stroke") of the cap 20 relative to the ring 70. Thus, the amount of fluid dispensed from the container in one stroke of the cap 20 is adjusted. The knob 90 is inserted in the ring 70. The knob 90 is rotatable around the limiting element 80 so that the position of the limiting element 80 relative to the knob 90 is changeable.

The limiting element 80 is an annular element that includes three bosses 82, a flange 84 and three protuberances 86. The bosses 82 are evenly arranged on an external face of the limiting element 80. The flange 84 extends on an internal face of the limiting element 80, near an end of the limiting element 80. The protuberances 86 are evenly formed on the flange 84. The second section 76 of the ring 70 includes three rectilinear grooves 88 corresponding to the protuberances 86.

Figure 5:
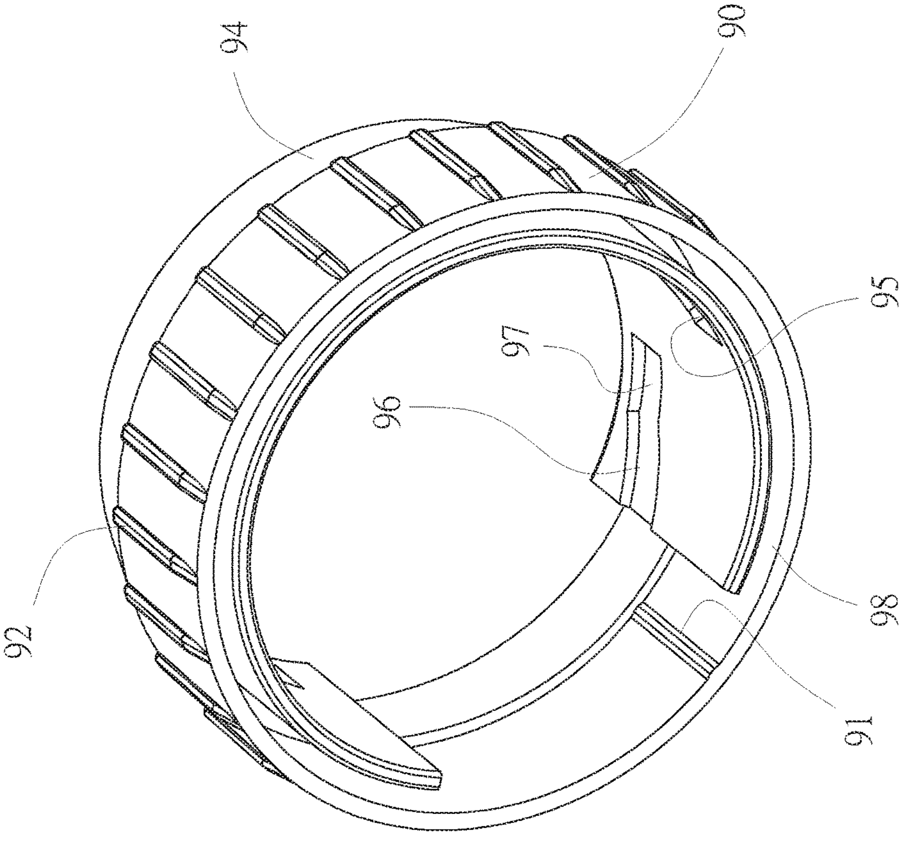
FIG. 5 is an enlarged perspective view of a knob of the adjustable pump shown in FIG. 1.
Figure 7:
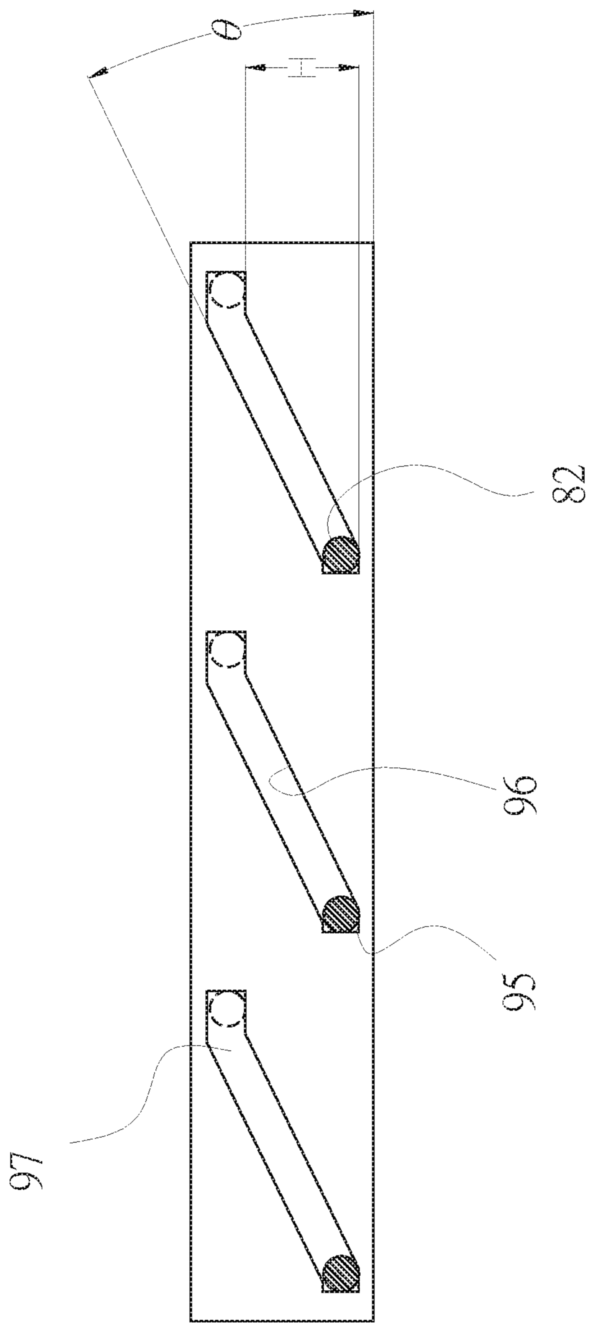
FIG. 7 is an enlarged partial cross-sectional view of the knob shown in FIG. 5.

Referring to FIG. 5, the knob 90 is an annular element that includes a rectilinear rib 91, a skid-proof unit 92, a stock indicator 94, three helical grooves 96 and an annular groove 98. The annular groove 98 divides the knob 90 into an external layer 98A and an internal layer 98B, with the external layer 98A extending for 360° and the internal layer 98B extending for about 270°.

The skid-proof unit 92 is made on or in an external face of the external layer 98A of the knob 90. The skid-proof unit 92 preferably includes alternatively arranged longitudinal ribs and grooves (not numbered).

The stock indicator 94 is also formed on the external face of the external layer 98A of the knob 90. For example, the stock indicator 94 includes notches, numbers, letters, patterns or colors to indicate stock of fluid left in the container.

Figure 6:
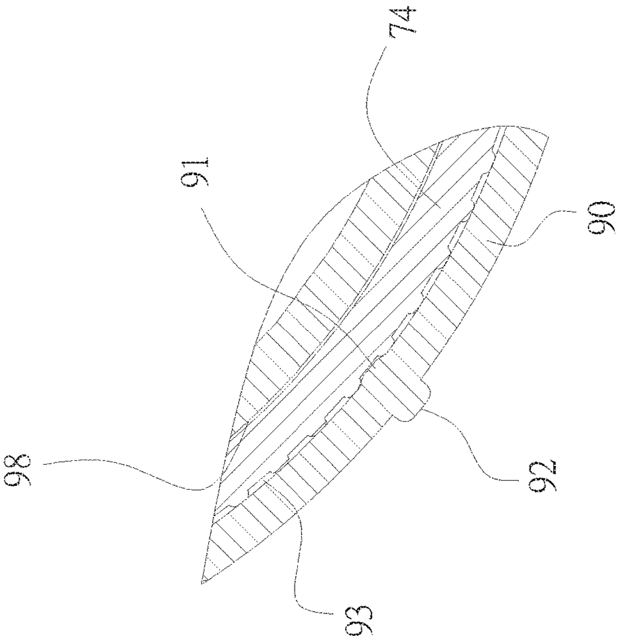
FIG. 6 is an enlarged partial cross-sectional view of the adjustable pump in another position than shown in FIG. 1.

The rectilinear rib 91 is formed on an internal face of the external layer 98A of the knob 90. Referring to FIG. 6, the annular wall 74 includes rectilinear grooves 93 in an external face. The rectilinear grooves 93 are shaped corresponding to the rectilinear rib 91.

The helical grooves 96 are made in an internal face of the internal layer 98B of the knob 90. Each of the helical grooves 96 includes a lower end 95 and an upper end 97.

The knob 90 is placed on the ring 70 so that the annular groove 98 receives the annular wall 74. The rectilinear rib 91 of the knob 90 is inserted in a selected one of the rectilinear grooves 93 of the annular wall 74 to place the knob 90 in a selected one of various angular positions relative to the annular wall 74.

The limiting element 80 is inserted in the knob 90. The bosses 82 are movably inserted in the helical grooves 96. The limiting element 80 is placed around the second section 76 of the ring 70. The protuberances 86 are inserted in the rectilinear grooves 88, thereby rendering the limiting element 80 rectilinearly movable but not rotatable relative to the ring 70.

The cap 20 is placed on the second section 76 of the ring 70. The blades 21 are inserted in the rectilinear grooves 88, thereby rendering the cap 20 rectilinearly movable but not rotatable relative to the ring 70.

The knob 90 can be rotated relative to the ring 70. At the same time, the limiting element 80 is moved relative to the ring 70 due to the cooperation of the helical grooves 96 with the bosses 82 and the cooperation of the protuberances 86 with the rectilinear grooves 88.

Referring FIGS. 2 to 4 and 7, the limiting element 80 is in the lowermost position relative to the ring 70 when each boss 82 is located at the lower end 95 of the corresponding helical groove 96. Now, the flange 84 of the limiting element 80 is located very close to the shoulder 71 of the ring 70. Hence, the stroke of movement of the cap 20 relative to the ring 70 is the longest. Hence, the largest amount of fluid is dispensed from the container by pressing the cap 20 on the ring 70 once.

The limiting element 80 is in the uppermost position relative to the ring 70 when each boss 82 is located at the upper end 97 of the corresponding helical groove 96. Hence, the stroke of movement of the cap 20 relative to the ring 70 is the shortest. Hence, the smallest amount of fluid is dispensed from the container by pressing the cap 20 relative to the ring 70 once.

It can be arranged that the limiting element 80 prevents the cap 20 from movement relative to the ring 70 when each boss 82 is located at the upper end 97 of the corresponding helical groove 96. In this case, no fluid is dispensed from the container.

The limiting element 80 is rectilinearly moved relative to the ring 70 for a distance H when the knob 90 is rotated relative to the ring 70 for an angle θ. The distance H is identical to the longest distance for which the cap 20 can be pushed relative to ring 70.

The helical grooves 96 can be made so that 0 to 1 ml of fluid is dispensed from the container by pressing the cap 20 on the ring 70 once. Alternatively, the helical grooves 96 can be made so that 0 to 0.5 ml of fluid is dispensed from the container by pressing the cap 20 relative to the ring 70 once.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An adjustable pump comprising a ring connected to an open end of a container and a cap rectilinearly movable relative to the ring to dispense fluid from the container, the improvement comprising:

the ring comprising an annular wall extending from end; and a quantity-adjusting unit comprising:

a limiting element adapted for contacting the cap and hence limiting the rectilinear movement of the cap relative to the ring, wherein the limiting element is rectilinearly movable relative to the ring to adjust a stroke of the movement of the cap relative to the ring, and the limiting element comprises at least one boss; and a knob rotatable relative to the ring around the limiting element, wherein the knob comprises:

at least one helical groove that receives the boss so that the limiting element is moved relative to the ring as the knob is rotated relative to the ring; and an annular groove made in an end, thereby dividing a portion of the knob into an external layer and an internal layer, wherein the annular wall of the ring is inserted in the annular groove and sandwiched between the external and internal layers of the knob, thereby rendering the rotation of the knob relative to the annular wall around the limiting element smooth.

2. The adjustable pump according to claim 1, wherein the helical groove comprises a lower end and an upper end, the limiting element renders the stroke of the movement of the cap relative to the ring longest when the boss is located at the lower end of the helical groove, and the limiting element renders the stroke of the movement of the cap relative to the ring shortest when the boss is located at the upper end of the helical groove.

3. The adjustable pump according to claim 1, wherein the ring comprises at least one rectilinear groove, and the limiting element comprises at least one protuberance inserted in the rectilinear groove to render the limiting element rectilinearly movable but not rotatable relative to the ring.

4. The adjustable pump according to claim 3, wherein the cap comprises at least one blade inserted in the rectilinear groove to render the cap rectilinearly movable but not rotatable relative to the ring.

5. The adjustable pump according to claim 1, wherein the limiting element comprises a flange adapted for abutment against a lower end of the cap to stop the rectilinear movement of the cap relative to the ring.

6. The adjustable pump according to claim 5, wherein the ring comprises at least one rectilinear groove, and the flange is formed with at least one protuberance inserted in the rectilinear groove to render the limiting element rectilinearly movable but not rotatable relative to the ring.

7. The adjustable pump according to claim 1, wherein the annular wall further comprises rectilinear grooves, and the knob comprises a rectilinear rib inserted in a selected one of the rectilinear grooves to keep the knob in a selected one of various angular positions relative to the annular wall.

8. The adjustable pump according to claim 1, wherein the knob comprises a skid-proof unit on an external face.

9. The adjustable pump according to claim 1, wherein the knob comprises a stock indicator on an external face.

* * * * *